United States Patent Office 3,009,810
Patented Nov. 21, 1961

3,009,810
FUMARIC ACID COMPOSITION
Stanley P. Raffensperger, Palos Park, and Thomas T. Takashima, La Grange, Ill., assignors to General Foods Corporation, White Plains, N.Y., a corporation of Delaware
No Drawing. Filed Jan. 7, 1959, Ser. No. 785,308
14 Claims. (Cl. 99—78)

The following invention relates to an improved method of increasing the solubility rate of fumaric acid in cold water and, in particular, the solubility rate of fumaric acid in fruit flavored beverages prepared by dissolving a dry beverage mix in cold water.

In the past, citric acid has been employed as an acidulant in dry beverage mixes capable of being dissolved in cold water. In addition to citric acid, such mixes usually contain other hydroscopic materials such as sugars and the like. Such compositions are relatively unstable if stored for extended periods of time since they readily absorb moisture and cake upon standing. The storage problem encountered with such dry beverage mixes has always been of great concern to those skilled-in-the-art and in particular the storage problems encountered in warm, humid climates. Fumaric acid has many properties which make it desirable for commercial use in such products. However, such uses are limited due to the fact that fumaric acid has a very low rate of solubility in cold water. While the dry beverage mixes of commerce must dissolve in cold water in less than one minute, the use of fumaric acid in such mixes in the past has been impossible due to the fact that the fumaric acid does not dissolve rapidly in cold water, periods as long as twenty-four hours at times not being sufficient to put all of the fumaric acid into solution.

It is an object of this invention to prepare a fumaric acid composition which has an increased rate of solubility in cold water. It is a further object of this invention to prepare a fumaric acid composition which when used in cold water soluble beverage mixes will not absorb substantial amounts of moisture upon standing and will be readily and easily soluble in cold water. It is a further object of this invention to prepare a fumaric acid composition which when used in cold water soluble beverage mixes will prevent the occurrence of chemical reactions during storage which cause degradation of the beverage flavor and color. It is still a further object of this invention to prepare a fumaric acid composition which when used in cold water soluble beverage mixes containing sucrose will prevent the undesirable inversion of the sucrose. Further objects of this invention will be apparent from a reading of the specification.

It has now been discovered that the rate of solubility of fumaric acid may be increased by mixing fumaric acid with a partial long chain fatty acid ester of a polyoxyethylene derivative of a hexitol anhydride derived from sorbitol. It is not known exactly how or why these derivatives improve the rate of solubility of fumaric acid, but it is believed that these derivatives have a solubilizing effect over and above that effect obtained by reducing fumaric acid to a fine powder.

While the addition of a partial long chain fatty acid ester of a polyoxyethylene derivative of a hexitol anhydride derived from sorbitol produces extremely satisfactory results, it has further been found that the addition of a small amount of propylene glycol enhances the effect of the polyoxyethylene derivative when in combination with fumaric acid in that the level of the derivative required to effect a high rate of solubility is substantially reduced. While water soluble derivatives such as polyoxyethylene sorbitan monolaurate (Tween 20), polyoxyethylene sorbitan palmitate (Tween 40), polyoxyethylene sorbitan monooleate (Tween 80) and the like may be employed, it is preferred to employ polyoxyethylene sorbitan stearate (Tween 60).

In producing the fumaric acid compositions according to certain aspects of this invention, the fumaric acid is preferably ground to effect size reduction, typically particle sizes of about 40 to 400 U.S. standard mesh are desirable and preferably a particle size of about 100–300 U.S. standard mesh.

The so ground fumaric acid may then be mixed with polyoxyethylene sorbitan stearate, although other polyoxyethylene sorbitan fatty acid esters may be employed. Preferably the amount of polyoxyethylene sorbitan stearate will be in an amount sufficient to coat the fumaric acid particles but in an amount insufficient to cause the particles to clump together. Preferably for each part by weight of fumaric acid about 0.1 to 1.5% of polyoxyethylene sorbitan stearate may be employed and preferably 0.7%. The fumaric acid and polyoxyethylene sorbitan stearate are blended and then ground to reduce the particle size so that the particles will pass through about a 100 to 400 U.S. standard mesh screen and preferably 100% through a 300 U.S. standard mesh screen. It is preferred when adding the polyoxyethylene sorbitan stearate to fumaric acid that the polyoxyethylene sorbitan stearate be at a temperature of at least room temperature.

In the preferred embodiment, 0.7% polyoxyethylene sorbitan stearate by weight of the fumaric acid and about 0.1 to 1.0% and preferably about 0.25% of propylene glycol by weight of the fumaric acid are added to the fumaric acid powder. It has been found that the propylene glycol assists in the coating of the fumaric acid with polyoxyethylene sorbitan stearate and in addition permits a reduction in the amount of polyoxyethylene sorbitan stearate which may be employed. Thus, in the case where polyoxyethylene sorbitan stearate is employed without propylene glycol, it is necessary to employ about 0.2 to 2.0% polyoxyethylene sorbitan stearate by weight of the fumaric acid whereas if about 0.1 to 1.0% of propylene glycol by weight of the fumaric acid is employed in addition to the polyoxyethylene sorbitan stearate, then it is only necessary to employ about 0.1 to 15.5% polyoxyethylene sorbitan stearate by weight of the fumaric acid. Furthermore, the propylene glycol reduces the amount of dust produced when the preferred particle size of fumaric acid is such that it is necessary to finely grind the fumaric acid.

The following example illustrates one embodiment of the present invention but it is to be understood that this example is for purposes of illustration only and that the invention is not limited thereto since various changes can be made by those skilled in the art without departing from its scope and spirit.

Five hundred pounds of fumaric acid having a mesh size of 100 U.S. standard mesh is mixed with 1.25 pounds of propylene glycol and 3.5 pounds of polyoxyethylene sorbitan stearate which have previously been mixed and blended at 120° F. The mixture of fumaric acid, propylene glycol and polyoxyethylene sorbitan stearate is well blended and then ground to reduce the size of the fumaric acid particles to particles of a size which will pass through a 200 U.S. standard mesh screen. When polyoxyethylene sorbitan stearate is employed in combination with the fumaric acid, less difficulty is encountered in grinding the fumaric acid since the amount of dusting is reduced.

The untreated fumaric acid has a solubility rate of 3.2 grams per two quarts of water in 15 to 20 minutes when dissolved in water at 45° F. whereas the fumaric acid composition prepared according to the present invention has a solubility rate of 3.2 grams per two quarts of water in one to three minutes when dissolved in water at 45° F.

The fumaric acid composition of the present invention may be employed wherever it is desired to utilize fumaric acid in cold water where a relatively rapid rate of solubility is required. One such use is in fruit flavored beverage mixes which are dissolved in very cold water. Such mixes typically contain sugars, an adible acid, flavoring and coloring. A typical fruit flavored beverage mix composition as employed in this invention is:

| | |
|---|---|
| Fumaric acid | 14.00–29.00 parts by weight. |
| Fruit Flavor (natural or imitation — fixed in gum arabic) | .25–1.75 parts by weight. |
| Color (FD & C—certified food coloring) | .10–1.25 parts by weight. |
| Dextrose hydrate or sucrose | Sufficient to bring the total parts by weight to 100. |

17.7 grams of the above mix may be dissolved in two quarts of cold water and to this solution may be added 1–1.5 cups of sugar to prepare a fruit flavored beverage. As an alternative, the sugar may be incorporated in the dry beverage mix rather than being added after the mix has been dissolved.

Fruit flavored beverage mixes which contain the fumaric acid composition of the present invention in combination with a hydroscopic sugar such as sucrose or the like exhibit little or no caking after extended periods of storage, and after such time, can be dissolved in cold water within several minutes. When the fumaric acid composition of the present invention is employed in fruit flavored beverage mixes which contain sucrose, flavoring, coloring and the fumaric acid composition as a substitute for citric acid, it is possible to reduce the total weight of acid about 25–35% while obtaining a beverage equally acceptable in taste. Furthermore, where dextrose is employed as the filler in such beverage mixes, it may be employed at lower levels when the fumaric acid composition of the present invention is used as a replacement for citric acid.

What is claimed is:

1. A method of preparing a fumaric acid-containing composition having an increased rate of solubility which comprises mixing a partial long chain fatty acid ester of a polyoxyethylene derivative of a hexitol anhydride derived from sorbitol with fumaric acid powder.

2. A method of preparing a fumaric acid-containing composition having an increased rate of solubility which comprises mixing a partial long chain fatty acid ester of a polyoxyethylene derivative of a hexitol anhydride derived from sorbitol with fumaric acid powder and finely grinding said mixture.

3. A method of preparing a fumaric acid-containing composition having an increased rate of solubility which comprises coating a partial long chain fatty acid ester of a polyoxyethylene derivative of a hexitol anhydride derived from sorbitol on fumaric acid powder and finely grinding said coated fumaric acid powder.

4. A method according to claim 3 wherein said coated fumaric acid powder is ground to the extent that 100% passes through a 300 U.S. standard mesh screen.

5. A method according to claim 3 wherein said ester of a polyoxyethylene derivative is mixed with propylene glycol.

6. A method according to claim 5 wherein the coating composition of said ester of a polyoxyethylene derivative and propylene glycol is heated to a temperature of at least room temperature prior to being coated on said fumaric acid powder.

7. A method according to claim 5 wherein the coating composition of said ester of a polyoxyethylene derivative and propylene glycol is heated to a temperature of 120° F. prior to being coated on said fumaric acid powder.

8. A method according to claim 3 wherein said ester of a polyoxyethylene derivative is polyoxyethylene sorbitan stearate.

9. A fumaric acid-containing composition having an increased rate of solubility in cold water which comprises a finely ground fumaric acid powder coated with a partial long chain fatty acid ester of a polyoxyethylene derivative of a hexitol anhydride derived from sorbitol.

10. A fumaric acid-containing composition having an increased rate of solubility in cold water which comprises a finely ground fumaric acid powder coated with a partial long chain fatty acid ester of a polyoxyethylene derivative of a hexitol anhydride derived from sorbitol and propylene glycol.

11. A fumaric acid-containing composition having an increased rate of solubility in cold water which comprises a fumaric acid powder coated with 0.2 to 2.0% polyoxyethylene sorbitan stearate by weight of the fumaric acid.

12. A fumaric acid-containing composition having an increased rate of solubility in cold water which comprises a fumaric acid powder coated with 0.1 to 1.5% polyoxyethylene sorbitan stearate by weight of the fumaric acid and 0.1 to 1.0% propylene glycol by weight of the fumaric acid.

13. A fumaric acid-containing composition having an increased rate of solubility in cold water which comprises a fumaric acid powder coated with 0.7% polyoxyethylene sorbitan stearate by weight of the fumaric acid and 0.35% propylene glycol by weight of the fumaric acid.

14. A cold water soluble fruit flavored beverage mix which comprises 14.0–29.0 parts by weight of a fumaric acid-containing composition having an increased rate of solubility in cold water comprised of a finely ground fumaric acid powder coated with a partial long chain fatty acid ester of a polyoxyethylene derivative of a hexitol anhydride derived from sorbitol, .25–1.75 parts by weight of fixed fruit flavor, .10–1.25 parts by weight of color and sufficient dextrose hydrate to bring the total parts by weight to 100.

References Cited in the file of this patent

UNITED STATES PATENTS

| | | |
|---|---|---|
| 2,463,962 | Gorcica et al. | Mar. 8, 1949 |
| 2,511,804 | Hall | June 13, 1950 |
| 2,694,641 | Atwood et al. | Nov. 16, 1954 |
| 2,824,807 | Laster et al. | Feb. 25, 1958 |
| 2,868,646 | Schapiro | Jan. 13, 1959 |

UNITED STATES PATENT OFFICE
CERTIFICATE OF CORRECTION

Patent No. 3,009,810                      November 21, 1961

Stanley P. Raffensperger et al.

It is hereby certified that error appears in the above numbered patent requiring correction and that the said Letters Patent should read as corrected below.

Column 2, line 43, for "15.5%" read -- 1.5% --; column 3, line 8, for "adible" read -- edible --.

Signed and sealed this 17th day of April 1962.

(SEAL)
Attest:

ESTON G. JOHNSON
Attesting Officer

DAVID L. LADD
Commissioner of Patents